M. ALTMAN.
IMPLEMENT FOR DECORATING FRUIT.
APPLICATION FILED DEC. 5, 1914.

1,146,610.

Patented July 13, 1915.

Witnesses:

Inventor:
Michael Altman

UNITED STATES PATENT OFFICE.

MICHAEL ALTMAN, OF CHICAGO, ILLINOIS.

IMPLEMENT FOR DECORATING FRUIT.

1,146,610.   Specification of Letters Patent.   Patented July 13, 1915.

Application filed December 5, 1914.   Serial No. 875,695.

*To all whom it may concern:*

Be it known that I, MICHAEL ALTMAN, a citizen of the United States, residing at Chicago, in the county of Cook and State of Illinois, have invented certain new and useful Improvements in Implements for Decorating Fruit, of which the following is a specification.

The present invention relates to an implement used for the purpose of decorating the edge of the skin of cut fruit, as for instance the halves of oranges, grape fruit, etc.

The objects of the present invention are to provide a device to accomplish the purpose above specified, which is cheap and simple of construction and easy of operation, and which will impart to the edge of the skin of the fruit a decorative and attractive appearance, whereby when served it will possess a pleasing appearance.

The invention further consists in the features of construction and combinations of parts hereinafter described and claimed.

Figure 1:
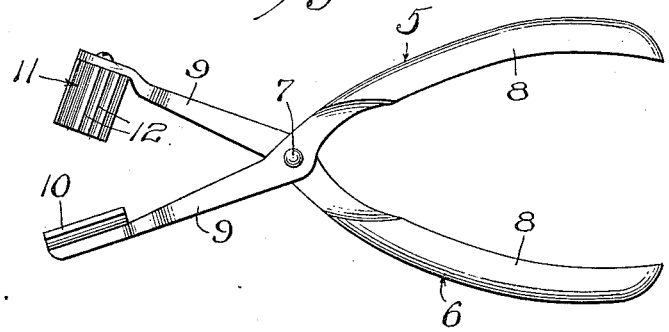
Figure 2:
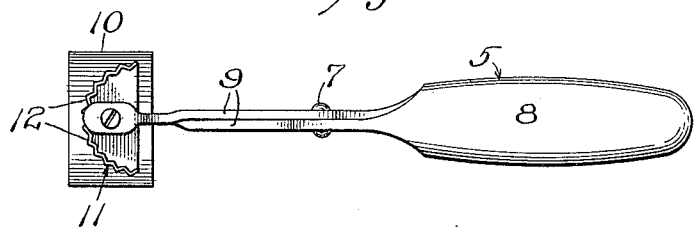
Figure 3:
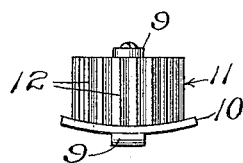
Figure 4:
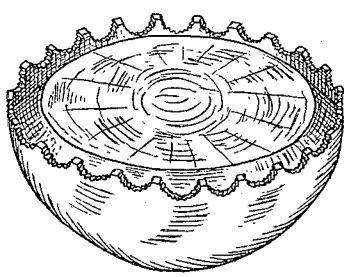

In the drawings: Figure 1 is a side view of an implement constructed in accordance with the teachings of the present invention; Fig. 2 is a plan view of the implement shown in Fig. 1; Fig. 3 is a face view of the cutting member of said implement; and Fig. 4 is a perspective showing a section of fruit decorated by the use of the implement of the present invention.

In the art to which the present invention relates, it has been long recognized by caterers, chefs, etc., that it is very desirable to serve fruit with the edges of the skin cut, or formed in a manner to give it a decorative appearance, but the idea has not been carried out because of the fact that the time and labor required to accomplish the result rendered it impractical.

The present invention deals with a very cheap and simple tool or device by the use of which a decorative effect can be obtained whereby the fruit may be served in an attractive and pleasing manner.

The device consists of two members 5 and 6 arranged crosswise of one another and pivoted together by a stud or rivet 7 at their intersection. Each member comprises a hand or gripping portion 8 and an extending portion 9. The member 5 at the end of its extending portion is provided with a plate 10 preferably formed on a curve, struck upon an arc corresponding with the average curve of grape fruit, oranges, etc. The extending portion of the member 6 is provided with a cutting member 11 in the form of a blade which, in the construction shown, is curvilinear in cross section, and is formed with a series of scallops or undulations 12, although the particular form of the blade is immaterial, as respects the scallops or undulations, since that feature might be changed to produce any form of decorative edges desired. The members 5 and 6 are held normally apart by a suitable spring member as is usual in pivoted devices of this nature.

In the operation of the device the meat of the fruit is cut back and away, to allow a portion of the skin to extend above the meat, and the operator then applies the instrument to make the scallops or configurations around the edges of the extending skin as will be understood from Fig. 4 of the drawings.

The device is extremely cheap and simple of construction and very easy of operation and when used will produce the results in a quick and speedy manner. By the use of the device the decorative effect is given to the fruit quickly and efficiently, since the cuts will always be of the same size and nature thus giving symmetry to the decorative edge of the fruit. By arranging the cutting member 11 of whatever configuration or size desired, it is obvious that a decoration can then be produced of most any form and size desired.

I claim:

In a fruit decorator, the combination of members arranged crosswise of one another and pivoted at their intersections, a curved plate carried by one of said members, a cutting member carried by the other of said members, said cutting member having its cutting edge curved in conformity with the curve of said plate and arranged to operate against the body of said plate and said cutting member being of curved formation in cross-section, substantially as described.

MICHAEL ALTMAN.

Witnesses:
 JACOB L. PASSAGE,
 THOMAS L. BRENNER.

Copies of this patent may be obtained for five cents each, by addressing the "Commissioner of Patents, Washington, D. C."